United States Patent
Erderly et al.

(12) 
(10) Patent No.: US 6,297,301 B1
(45) Date of Patent: *Oct. 2, 2001

(54) THERMOPLASTIC ELASTOMER COMPOSITIONS HAVING IMPROVED PROCESSING PROPERTIES

(75) Inventors: Thomas C. Erderly, Baytown, TX (US); James J. Chludzinski, Whitehouse Station, NJ (US); Armen H. Dekmezian, Kingwood; Angelo A. Montagna, Houston, both of TX (US); Dennis G. Peiffer, Annandale, NJ (US); Maria D. Ellul, Silver Lake, OH (US); Donald R. Hazelton, Hudson, OH (US); Barry M. Rosenbaum, Shaker Heights, OH (US)

(73) Assignees: ExxonMobil Chemical Patents Inc., Houston, TX (US); Advanced Customer Systems, L.P., Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,405

(22) Filed: Oct. 16, 1997

Related U.S. Application Data

(63) Continuation-in-part of application No. 08/906,870, filed on Aug. 6, 1997, now Pat. No. 6,124,428.
(60) Provisional application No. 60/022,432, filed on Aug. 7, 1996.

(51) Int. Cl.[7] ............... C08L 23/04; C08L 9/00; C08L 23/10; C08L 47/00
(52) U.S. Cl. ............ 524/157; 524/155; 524/156; 575/191; 575/240
(58) Field of Search .................... 524/157, 155, 524/156; 525/191, 240

(56) References Cited

U.S. PATENT DOCUMENTS

| | | |
|---|---|---|
| 3,326,880 | 6/1967 | Binsbergen . |
| 3,327,020 | 6/1967 | Binsbergen . |
| 3,327,021 | 6/1967 | Binsbergen . |
| 4,307,009 * | 12/1981 | Luders .............. 260/42.14 |
| 4,829,116 | 5/1989 | Piesold ................ 524/278 |
| 5,157,081 | 10/1992 | Puydak et al. ........ 525/237 |
| 5,290,886 | 3/1994 | Ellul .................... 524/515 |

FOREIGN PATENT DOCUMENTS

| | | |
|---|---|---|
| 731225 | 3/1966 | (CA) . |
| OF 2823507 | 12/1979 | (DE) . |
| 266596 | 5/1988 | (EP) . |
| 336573 | 10/1989 | (EP) . |
| 399445 | 11/1990 | (EP) . |
| 1104662 | 2/1968 | (GB) . |
| 1155353 | 6/1969 | (GB) . |
| 1078738 | 8/1997 | (GB) . |
| S 60-106846 | 6/1985 | (JP) . |
| S 59-176339 | 2/1991 | (JP) . |
| 293399 | 5/1988 | (NL) . |

OTHER PUBLICATIONS

Patent Abstracts of Japan vol. 009, No. 254 (C–308), Oct. 11, 1985 & JP 60 106846 A (Mitsui Sekiyu Kagaku Kogyo KK), Jun. 12, 1985 & Derwent Publications Ltd., London, GB; AN 86–071418 XP002095377.

G. Odian, Principles of Polymerization, Third Ed., (1991), 705–708, John Wiley (New York).*

* cited by examiner

*Primary Examiner*—Fred Zitomer

(57) ABSTRACT

Thermoplastic elastomers having improved processability are prepared by incorporating one or more organic sulfate or sulfonate salts into blends of thermoplastic polymers and olefinic rubber and melt processing the mixture. The rubber component of the mixture is preferably at least partially cured.

27 Claims, No Drawings

THERMOPLASTIC ELASTOMER COMPOSITIONS HAVING IMPROVED PROCESSING PROPERTIES

This application is a continuation-in-part of U.S. application Ser. No. 08/906,870, filed Aug. 6, 1997, U.S. Pat. No. 6,124,428, which is in turn based on provisional application 60/022432 filed Aug. 7, 1996.

BACKGROUND OF THE INVENTION

1. Field of the Invention

The invention relates to thermoplastic elastomer compositions based on a blend of a thermoplastic material and a cured or non-cured elastomer, and to the processing of such compositions.

2. Description of Related Art

A thermoplastic elastomer is generally defined as a polymer or blend of polymers that can be processed and recycled in the same way as a conventional thermoplastic material, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

Polymer blends which have a combination of both thermoplastic and elastic properties are generally obtained by combining a thermoplastic polymer with an elastomeric composition in a way such that the elastomer is intimately and uniformly dispersed as a discrete particulate phase within a continuous phase of the thermoplastic. Early work with vulcanized compositions is found in U.S. Pat. No. 3,037,954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a microgel dispersion of cured elastomer, such as butyl rubber, chlorinated butyl rubber, polybutadiene or polyisoprene in an uncured matrix of thermoplastic polymer such as polypropylene.

Depending on the ultimate application, such thermoplastic elastomer (TPE) compositions may comprise one or a mixture of thermoplastic materials such as propylene homopolymers and propylene copolymers and like thermoplastics used in combination with one or a mixture of cured or non-cured elastomers such as ethylene/propylene rubber, EPDM rubber, diolefin rubber, butyl rubber or similar elastomers. TPE compositions may also be prepared where the thermoplastic material used is an engineering resin having good high temperature properties, such as a polyamide or a polyester, used in combination with a cured or non-cured elastomer. Examples of such TPE compositions and methods of processing such compositions, including methods of dynamic vulcanization, may be found in U.S. Pat. Nos. 4,130,534, 4,130,535, 4,594,390, 5,177,147 and 5,290,886, as well as in WO 92/02582.

TPE compositions are normally melt processed using conventional thermoplastic molding equipment such as by injection molding, compression molding, extrusion, blow molding or other thermoforming techniques. In such TPE compositions, the presence of the elastomeric component does not necessarily improve the processability of the composition. In fact, where the elastomeric component is partially or fully cured (cross-linked) in-situ during the mixing of the TPE polymer components (dynamically vulcanized), or where a dynamically vulcanized TPE composition is further processed, there are heavier demands placed upon processing machinery as compared with the processing of a thermoplastic composition which is free of cured elastomer. Increases such as higher motor load, head pressure and/or torque can place undesirable, unacceptable, or unattainable requirements on specific machinery. For instance, a specific extruder having a specific motor power and gearing, will reach a maximum of motor load, or head pressure, under certain melt temperature conditions for a given polymer being processed. If a polymer or polymer blend is introduced to such an extruder which has such a higher requirement for power to process at least one component, such as a polymer having higher molecular weight and/or narrower molecular weight distribution and/or lower shear sensitivity, the extruder will reach a maximum of one or several of these parameters, and be therefore limited in its ability to pump/perform at a similar level to the performance expected with a more easily processable polymer. In the alternative, if melt blending or processing machinery is to be used for certain production/extrusion, and it is not so limited, the prospect of using more power or increasing head pressure for a more difficult to extrude material would be achievable, but the user of the machinery would still nonetheless desire to conserve power.

Additionally, TPE compositions may exhibit other imperfections during extrusion, specifically film extrusion, that may be undesirable, such as melt fracture. These imperfections are undesirable from a quality standpoint. For example, melt fracture also known as "shark skin" or "orange peel", can lead to poorer optical properties and/or diminished film physical properties that are generally unacceptable. Adjustments to the extrusion process which are made to avoid the development of melt fracture generally involve a slowing down of the process which leads to a reduced rate of extrudate output.

Various prior art references generally disclose the addition of various additives to olefin polymer compositions to improve the extrusion or other properties of the polymer. For example, GB 1,104,662 teaches addition of the salt of alkyl benzene sulfonic acids to polyolefins that purportedly gives a beneficial effect on melt extrusion behavior of the polyolefin. The purported effect is the reduction of the occurrence of "shark skin" or "orange peel". Both alkali and alkaline earth metal salts of alkyl benzene sulfonic acids are said to be effective.

GB 1,078,738 discloses that addition of an "external lubricant" to high molecular weight polyolefins can, purportedly, reduce occurrence of melt fracture. Suggested as external lubricants are salts of monovalent to tetravalent metals, and saturated or unsaturated carboxylic acids containing 10 to 50 carbon atoms. Sulfonates corresponding to the fatty acid salts are also said to be suitable.

JP A 59-176339 discloses that when polyolefins are narrowed in MWD or given higher molecular weight, poor fluidity results which in turn gives rise to melt fracture. The solution suggested is addition of fluorinated compounds including potassium salts of fluoroalkylsulfonic acids. These potassium salts are said to exhibit preferable temperature dependence when compared to other cations such as sodium, calcium, lithium and ammonium. The polyolefin/salt combination is said to be effective at 230° C. or higher.

DE 2,823,507 discloses calendered ethylene polymers and propylene polymers containing alkali or alkaline earth mono sulfonates such as alkyl sulfonates, alenyl sulfonates, alkylaryl sulfonates and succinic acid dialkyl ester sulfonates. Sodium or calcium mono sulfonates are preferred. A suggested benefit is purported to be outstanding separation of the polymer from calendering rolls.

Canadian Patent 731,225 discloses the use of alkali metal salts of certain monosulfonic acids as additives to crystallizable polypropylene compositions to modify the crystallization properties of the polymer. Although these compositions may also include an elastomeric polymer as an impact modifier, the reference does not indicate that the additives improve polymer processability.

There is a need therefore for a relatively inexpensive, easily implemented solution to the processing problems outlined above. Such a solution should also include a material that will readily melt or incorporate into the melted TPE and not adversely affect physical properties, not interfere with crosslinking chemistry or structure produced by that chemistry, not be extractable, or negatively impact organolleptics of shaped TPE articles. Specifically, there is a commercial need for a material that may be easily incorporated into TPE compositions, that will reduce or eliminate the increased power requirement (e.g., motor load and or torque) and increased head pressure.

SUMMARY OF THE INVENTION

This invention provides a thermoplastic elastomer composition comprising a blend of: a) a thermoplastic polymer; b) an olefinic rubber; and c) from about 0.005 to 5 wt %, based on the polymeric content of said blend, of at least one sulfate or sulfonate salt having the formula $(R-SO_x)M$ where X is 3 or 4, R is an organic aliphatic radical containing from 6 to 30 carbon atoms and M is a cation selected from the group consisting of alkali metals, alkaline earth metals and ammonium.

The invention also provides a process for forming a composition or an extruded article comprising melt blending a thermoplastic elastomer composition comprising a blend of: a) a thermoplastic polymer; b) an olefinic rubber; and c) from about 0.005 to 5 wt %, based on the polymeric content of said blend, of at least one sulfate or sulfonate salt having the formula $(R-SO_x)M$ where X is 3 or 4, R is an organic aliphatic radical containing from 6 to 30 carbon atoms and M is a cation selected from the group consisting of alkali metals, alkaline earth metals and ammonium.

The invention is based on the discovery that inclusion of the above-described sulfate or sulfonate salts in TPE molding compositions results in a marked reduction of the energy requirements for melt processing and extrusion of conventional TPE compositions. In addition, injection mold spiral flow lengths are increased and fill times are significantly lowered which leads to reduced cycle times in injection molding processes.

DETAILED DESCRIPTION OF THE INVENTION

Following is a description of the various ingredients which may be used to formulate the TPE compositions of this invention.

Thermoplastic Polymer

Thermoplastic polymers suitable for use in the present invention include amorphous, partially crystalline or essentially totally crystalline polymers selected from the group consisting of polyolefins, polyamides, polyimides, polyesters, polycarbonates, polysulfones, polylactones, polyacetals, acrylonitrile/butadiene/ styrene copolymer resins, polyphenylene oxides, ethylene-carbon monoxide copolymers, polyphenylene sulfides, polystyrene, styrene/acrylonitrile copolymer resins, styrene/maleic anhydride copolymer resins, aromatic polyketones and mixtures thereof.

Polyolefins suitable for use in the compositions of the invention include thermoplastic, at least partially crystalline polyolefin homopolymers and copolymers, including polymers prepared using Ziegler/Natta type catalysts or metallocene catalysts. They are desirably prepared from monoolefin monomers having 2 to 6 carbon atoms, such as ethylene, propylene, 1-butene, isobutylene, 1-pentene, copolymers containing these monomers, and the like, with propylene being the preferred monomer. As used in the specification and claims, the term polypropylene includes homopolymers of propylene as well as reactor copolymers of propylene which can contain about 1 to about 20 wt % of ethylene or an alpha-olefin comonomer of 4 to 16 carbon atoms or mixtures thereof. The polypropylene can be highly crystalline isotactic or syndiotactic polypropylene, usually having a narrow range of glass transition temperature ($T_g$). Commercially available polyolefins may be used in the practice of the invention.

Suitable theromplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon 6), polylauryllactam (nylon 12), polyhexamethyleneadipamide(nylon-6,6), polyhexamethyleneazelamide(nylon 6,9), polyhexamethylenesebacamide(nylon 6,10), polyhexamethyleneisophthalamide(nylon- 6, IP) and the condensation product of 11-amino-undecanoic acid (nylon 11). Commercially available thermoplastic polyamides may be advantageously used in the practice of this invention, with linear crystalline polyamides having a softening point or melting point between 160° C.–230° C. being preferred.

Suitable thermoplastic polyesters which may be employed include the polymer reaction products of one or a mixture of alphatic or aromatic polycarboxylic acids esters of anhydrides and one or a mixture of diols. Examples of satisfactory polyesters include poly (trans-1,4-cyclohexylene $C_{2-6}$ alkane discarboxylates such as poly (trans-1,4-cyclohexylene succinate) and poly (trans-1,4-cyclohexylene adipate); poly (cis or trans- 1,4-cyclohexanedimethylene) alkanedicarboxylates such as poly (cis 1,4-cyclohexane-di-methylene) oxlate and poly-(cis 1,4-cyclohexane-di- methylene) succinate, poly ($C_{2-4}$ alkylene terephthalates) such as polyethyleneterephthalate and polytetramethylene-terephthalate, poly ($C_{2-4}$ alkylene isophthalates such as polyethyleneisophthalate and polytetramethyleneisophthalate and like materials. Preferred polyester are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) thermoplastic engineering resins which may be used in accordance with this invention are well known, commercially available materials produced by the oxidative coupling polymerization of alkyl substituted phenols. They are generally linear polymers having a glass transition temperature in the range of about 190° C. to 235° C. Examples of preferred PPE polymers include poly (2,6-dialkyl-1,4 phenylene ethers) such as poly(2,6 dimethyl-1,4-phenylenether), poly 2-methyl-6-ethyl-1,4-phenylene ether), poly-(2,6-dipropyl-1,4-phenylene ether) and poly (2-ethyl-6-propyl-1,4-phenylene ether). These polymers, their method of preparation and blends with polystyrene are further described in U.S. Pat. No. 3,383,435, the complete disclosure of which is incorporated herein by reference.

Other thermoplastic resins which may be used include the polycarbonate analogs of the polyesters described above such as segmented poly(ether co-phthalates); polycaprolactone polymers; styrene resins such as copolymers of styrene with less than 50 mole % of acrylonitrile (SAN) and resinous copolymers of styrene, acrylonitrile and butadiene (ABS); sulfone polymers such as polyphenyl sulfone, and like engineering resins as are known in the art.

Olefinic Rubber

Suitable rubbery materials which may be used include monoolefin copolymeric rubbers, isobutylene copolymers and diolefin rubbers, as well as mixtures thereof.

Suitable monoolefin copolymer rubbers comprise non-polar, essentially non-crystalline, rubbery copolymers of two or more alpha-monoolefins, preferably copolymerized with at least one polyene, usually a diene. Saturated monoolefin copolymer rubber, for example ethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); vinylnorbornene (VNB) 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); and the like.

Butyl rubbers are also useful in the compositions of the invention. As used in the specification and claims, the term "butyl rubber" includes copolymers of an isoolefin and a conjugated monoolefin, terpolymers of an isoolefin, a conjugated monoolefin and divinyl aromatic monomers, and the halogenated derivatives of such copolymers and terpolymers. The useful butyl rubber copolymers comprise a major portion of isoolefin and a minor amount, usually less than 30 wt %, of a conjugated multiolefin, and are preferably halogenated, e.g., brominated, to faciliate curing. The preferred copolymers comprise about 85–99.5 wt % of a $C_{4-7}$ isoolefin such as isobutylene and about 15–0.5 wt % of a multiolefin of 4–14 carbon atoms, such as isoprene, butadiene, dimethyl butadiene and piperylene. Commercial butyl rubber, useful in the invention, is a copolymer of isobutylene and minor amounts of isoprene. Other butyl co- and terpolymer rubbers are illustrated by the description in U.S. Pat. No. 4,916,180, which is fully incorporated herein by this reference.

Another suitable copolymer within the scope of the olefinic rubber of the present invention is a copolymer of a $C_{4-7}$ isomonoolefin and a para-alkylstyrene, and preferably a halogenated derivative thereof. The amount of halogen in the copolymer, predominantly present as benzylic halogen, is from about 0.1 to about 10 wt %. A preferred example is the brominated copolymer of isobutylene and para-methylstyrene. These copolymers are more fully described in U.S. Pat. No. 5,162,445, which is fully incorporated herein by reference.

Another olefinic rubber class which may be used are diolefins such as polybutadiene as well as elastomeric random copolymers of butadiene with less than 50 wt % of styrene or acrylonitrile. Other suitable diolefin materials include natural rubber or synthetic polyisoprene. Mixtures comprising two or more of the olefinic rubbers may also be used.

Depending upon the desired applications, the amount of olefinic rubber present in the composition may range from about 10 to about 90 wt % of the total polymer content of the composition. In most applications and particularly where the rubber component is dynamically vulcanized, the rubber component will constitute less than 70 wt %, more preferably less than 50 wt %, and most preferably about 10–40 wt % of the total polymer content of the composition.

Surfactants

The surfactants useful in the present invention include one or a mixture of sulfate and sulfonate salts having the generic formula $(RSO_x)M$ wherein X is 3 or 4, R is an organic radical containing from 6 to 30 carbon atoms and M is a cation selected from the group consisting of alkali metals, alkaline earth metals and ammonium. Materials of this type are well known in the detergent art and are commercially available.

Preferred surfactants are those where R is a branched or straight chain aliphatic group including alkyl, mono or di unsaturated alkenyl, alkoxy, hydroxy substituted alkyl or alkoxy alkyl. M is preferably selected from lithium, sodium, potassium, calcium or magnesium, with sodium most preferred. M may also be an ammonium cation or a quaternary ammonium cation. Suitable surfactants include sodium lauryl sulfate or sulfonate, sodium alpha olefin sulfonate, ammonium lauryl sulfate, ammonium lauryl sulfonate, sodium myristyl sulfate or sulfonate, sodium octyl sulfate, and like materials. Preferred surfactants are those where R contains 8 to 20 carbon atoms, more preferably 12 to 18 carbon atoms and where R is free of halogen, e.g., fluorine substituent groups and does not contain aromatic groups.

The selection of particular surfactant is dictated by the fact that the melting point of the surfactant should be lower than the temperature at which the polymer compositions is processed, and preferably be lower than the softening or melting point of the thermoplastic polymer component (and the rubber component) present in the blend, preferably at least about 10° C. lower. Since the surfactant appears to function as an external lubricant during processing, it is important that it be in the melt state along with the molten polymers being processed. Thus preferred surfacants are those with a melting point below 240° C., more preferably below 230° C. and most preferably below 210° C., e.g., sodium lauryl sulfate or sulfonate or sodium alpha olefin sulfonates. On the other hand where the thermoplastic polymer being processed is of relatively high melting point, e.g., polyamides, then higher melting point surfactants may be used, e.g., the alkaline earth metal sulfate or sulfonate salts.

Another factor dictating the choice of surfactant is that it should be insoluble or only sparingly soluble in liquid or semi-liquid additive materials included in the composition, such as processing oils. Severe dilution of the surfactant by such additives will result in a diminution or loss of the enhanced melt processing characteristics of the surfactant.

The surfactant may be incorporated into the composition at a level of from about 0.005 to 5 wt%, more preferably from 0.01 to 0.5 wt% and most preferably from 0.03 to 0.35 wt%, based on the polymeric content of the blend.

Additives

The compositions of the invention may include plasticizers, curatives and may also include reinforcing and non-reinforcing fillers, antioxidants, stabilizers, rubber processing oil, plasticizers, extender oils, lubricants, antiblocking agents, anti-static agents, waxes, foaming agents, pigments, flame retardants and other processing aids known in the rubber compounding art. Such additives can comprise up to about 50 wt% of the total composition. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions, but are preferably paraffinic. The type will be that ordinarily used in conjunction with the specific rubber or rubbers present in the composition, and the quantity based on the total rubber content may range from zero up to 1–200 parts by weight per hundred rubber (phr). Plasticizers such as trimellitate esters may also be present in the composition.

Processing

The olefin rubber component of the thermoplastic elastomer is generally present as small, i.e., micro-size, particles within a continuous plastic matrix, although a co-continuous morphology or a phase inversion is also possible depending on the amount of rubber relative to plastic, and the cure system or degree of cure of the rubber. The rubber is desirably at least partially crosslinked, and preferably is completely or fully cross-linked. The partial or complete crosslinking can be achieved by adding an appropriate rubber curative to the blend of thermoplastic polymer and rubber and vulcanizing the rubber to the desired degree under conventional vulcanizing conditions. However, it is preferred that the rubber be crosslinked by the process of dynamic vulcanization. As used in the specification and claims, the term "dynamic vulcanization" means a vulcanization or curing process for a rubber contained in a thermoplastic elastomer composition, wherein the rubber is vulcanized under conditions of high shear at a temperature above the melting point of the component thermoplastic. The rubber is thus simultaneously crosslinked and dispersed as fine particles within the matrix thermoplastic, although as noted above other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding, blow molding and compression molding. Scrap or flashing can be salvaged and reprocessed.

Those ordinarily skilled in the art will appreciate the appropriate quantities, types of cure systems and vulcanization conditions required to carry out the vulcanization of the rubber. The rubber can be vulcanized using varying amounts of curative, varying temperatures and varying time of cure in order to obtain the optimum crosslinking desired.

Any known cure system for the rubber can be used, so long as it is suitable under the vulcanization conditions with the specific olefinic rubber or combination of rubbers being used and with the thermoplastic component. These curatives include sulfur, sulfur donors, metal oxides, resin systems, peroxide-based systems, hydrosilation curatives, containing platinum or peroxide catalysts, and the like, both with and without accelerators and co-agents. Such cure systems are well known in the art and literature of vulcanization of elastomers.

The terms "fully vulcanized" and "completely vulcanized" as used in the specification and claims mean that the rubber component to be vulcanized has been cured to a state in which the elastomeric properties of the crosslinked rubber are similar to those of the rubber in its conventional vulcanized state, apart from the thermoplastic elastomer composition. The degree of cure can be described in terms of gel content or, conversely, extractable components. Alternatively the degree of cure may be expressed in terms of crosslink density. All of these descriptions are well known in the art, for example in U.S. Pat. Nos. 5,100,947 and 5,157,081, both of which are fully incorporated herein by reference.

The processing surfactants may be included in the composition during the manufacture of the TPE composition by processes as described above, or may be later combined with pelletized TPE compositions used by a processor to manufacture shaped articles. For example, TPE extruded pellets may be thoroughly mixed with the surfactant in finely divided powder or liquid form to thoroughly coat each pellet, and the coated pellets introduced into an extruder along with any other additives used by the processor to produce extruded shaped articles by such process as injection molding, compression molding, blow molding and similar extrusion processes.

Melt processing temperatures will generally range from above the melting point of the highest melting polymer present in the TPE composition up to about 300° C. Preferred processing temperatures will range from about 140° C. up to 250° C., more preferably from about 150° C. up to 225° C.

The following examples are illustrative of the invention.

TPE compositions used in the following examples are as follows:

TPE-U A thermoplastic elastomer comprising a mixture of 100 parts by weight of EPDM rubber (VISTALON® 7500 supplied by Exxon Chemical Co.) and 50 parts by weight of isotactic polypropylene.

TPE-DO A dynamically vulcanized version of TPE-U cured using a phenolic resin curing system and containing 107 parts by weight of paraffin oil per 100 parts by weight of EPDM.

TPE-DN A dynamically vulcanized thermoplastic elastomer cured using a phenolic resin curing system and based on a mixture of 100 parts by weight of an elastomeric copolymer of butadiene and acrylonitrile, 35 parts by weight of isotactic polypropylene, and 50 parts by weight of a trimellitate ester plasticizer.

TPE-DS A dynamically vulcanized blend of 100 parts by weight EPDM rubber, 41 parts by weight of isotactic polypropylene and 130 parts by weight of paraffin oil cured using a phenolic resin curing system.

TPE-DSA Same as TPE-DS but containing 220 parts by weight isotatic polypropylene and 100 parts by weight EPDM rubber.

TPE-DSB A dynamically vulcanized blend of 100 parts by weight EPDM rubber, 50 parts by weight isotactic polypropylene, 176 parts by weight processing oil and cured using a hydrosilation cure system.

TPE-DXL A dynamically vulcanized blend of EPDM rubber and polyolefin, containing low amounts of hydrocarbon oil and cured with a peroxide cure system.

TPE-DT A dynamically vulcanized blend of butyl rubber, isotactic polypropylene, oil and curatives.

EXAMPLE 1

This example demonstrates a reduction in torque (as measured by changes in amperage) of compositions of this invention when melt processed. A pelletized form of the TPE compositions listed in Table 1 were each introduced into a Brabender™ Plasti-Corder melt mixer which was heated at 200° C. Typically, 50–60 g. of material is introduced at a rotation speed of 40 RPM. Upon complete melting, the torque remains essentially invariant with time and is used as the base value. Subsequently, measured amounts of sodium alpha-olefin sulfonate surfactant (Bio Terge® AS-90 marketed by Stepan Co., Northfield, Ill.) were added to each sample in the amounts listed in Table 1. After several minutes of mixing, the torque was again measured at 40 RPM and compared with the base value for each sample.

As shown in Table 1, torque reductions ranging from 7.9 to 16.0% were achieved.

TABLE 1

| Sample | Surfactant CONC, (ppm) | Torque Reduction (%) |
| --- | --- | --- |
| TPE-U | 3500 | 7.9 |
| TPE-U | 5000 | 16.0 |
| TPE-DO | 3500 | 9.3 |
| TPE-DO | 5000 | 12.0 |
| TPE-DN | 3500 | 11.3 |
| TPE-DN | 5000 | 16.0 |

This example illustrates the effect of surfactants of this invention on extrusion properties. TPE-DS thermoplastic elastomer identified above in pellet form was tumbled in a drum with 1.14 g. HT100 mineral oil per pound of TPE-DS. The surfactant in powder form was then added at the levels shown in Table 2 and the material was tumbled another ½ hour to uniformly coat the pellets. Comparative samples of TPE-DS coated with a known processing aid (Dow Corning MB50-001 silicone rubber concentrate) were also prepared. The material identified in Table 2 as "AOK" is also a sodium salt of an alpha-olefin sulfonate available from Witco Chemical Co., Greenwich, Conn. Prior to extrusion, the coated materials were run into a Berstorff ZE-43 extruder at 350 rpm and at 234° C. to homogenize the dispersion. The torque for each sample processed in the extruder was measured in Amps and results are shown in Table 2.

TABLE 2

|  | Torque | % Reduction Torque |
| --- | --- | --- |
| Control TFE-DS | 33 | 0.0 |
| 0.35% AS-90 | 31 | 6.1 |
| 0.5% AS-90 | 29 | 12.1 |
| 0.35% AOK | 33 | 0.0 |
| 0.5% AOK | 28 | 15.2 |
| 5% AOK | 26 | 21.2 |
| 0.5% MB50-001 | 33 | 0.0 |
| 5% MB50-001 | 31 | 6.1 |

Samples as shown in Table 2 were then fed into a Killion 3 horsepower extruder heated to a 3 zone temperature ranging from about 190° C. to 200° C. and extruded into ribbon through a 0.020 inch slit die at a melt temperature of about 215° C. Extruder parameters for each sample processed are shown in Table 3.

TABLE 3

| Extruder Parameters | Head Pressure psi | Amps | lb/hr* | % Reduction Amps | % Change lb/hr | |
| --- | --- | --- | --- | --- | --- | --- |
| Control TPE-DS | 450 | 2.7 | 5.16 | 0.0 | 0.0 | |
| 0.35% AS-90 | 440 | 2.4 | 5.24 | 2.2 | 1.6 | |
| 0.5% AS-90 | 430 | 2.4 | 5.24 | 4.4 | 1.6 | |
| 0.35% AOK | 430 | 2.4 | 4.92 | 4.4 | −4.7 | Slippage Minor |
| 0.5% AOK | 420 | 2.1 | 4.88 | 6.7 | −5.4 | Slippage Minor |
| 5% AOK** | 250 | 1.5 | 5.20 | 44.4** | 0.8 | |
| 0.5% MB50-001 | 450 | 2.4 | 5.16 | 0.0 | 0.0 | |
| 5% MB50-001 | 380 | 2.1 | 4.6 | 15.6 | −10.9 | Slippage |

*Output measured after 3 min run. Between runs the material was extruded for 15 mins before any readings or output measurements were taken. Between materials a purge was made.
**Duplicated 3 times.

The parameters as measured in Table 3 demonstrate a general reduction in extruder head pressure and torque as measured by the Amps. Output rate as measured in lb/hour was also not compromised and in most cases increased as compared with the control containing no processing aid. In contrast, the comparative samples containing 5% silicone polymer showed significant slippage and therefore a loss of output.

EXAMPLE 3

The same materials as described in Example 2 were injection molded using a Cincinnati Millacron 250 ton injection molder operating under the following conditions:

| | |
| --- | --- |
| Machine Heat Settings | Rear 182° C., Center 188° C., Front 194° C., Nozzle 200° C. |
| Melt temperature | 210° C. |
| Shot Size | 0.85 inch |
| Cushion | 0.19 inch |
| Screw | 100 rpm |
| Ram Velocity | 3.0 inch/sec. |

Injection molding results using an 1S0 standard mold to make plaques of 2 mm thickness are shown in Table 4.

TABLE 4

| | FILL TIME (SEC) | PACK (SEC) | HOLD (SEC) | COOLING (SEC) | PRESS. 1st STAGE psi | PRESS. BACK psi | PRESS. HOLD psi | PRESS. BACK psi |
|---|---|---|---|---|---|---|---|---|
| CONTROL TPE-DS | 1.42 | 3.0 | 2.0 | 30.0 | 609 | 350 | 200 | 0 |
| 0.35% AS-90 | 2.167 | 3.0 | 2.0 | 30.0 | 605 | 350 | 200 | 0 |
| 0.5% AS-90 | 0.63 | 3.0 | 2.0 | 25.0 | 578 | 350 | 200 | 0 |
| 0.35% AOK | 0.55 | 3.0 | 2.0 | 25 | 602 | 350 | 200 | 0 |
| 0.5% AOK | 0.6 | 3.0 | 2.0 | 30.0 | 605 | 350 | 200 | 0 |
| 5% AOK | 0.49 | 3.0 | 2.0 | 25.0 | 580 | 350 | 200 | 0 |
| 0.5% MB50-001 | 0.94 | 3.0 | 2.0 | 30.0 | 589 | 350 | 200 | 0 |
| 5% MB50-001 | — | 3.0 | 2.0 | 25 | 602 | 350 | 200 | 0 |

As shown in Table 4, the general effect of the use of the surfactants of this invention is to lower the fill time up to a factor of three, which thereby represents a potential of lowering the overall cycle time. It was also observed that at all pressures there was a significant improvement in spiral flow for additives used at the 5% by weight level. Also, mold sticking was observed in all samples containing the silicone polymer, but no mold sticking took place in samples containing the surfactants of this invention.

EXAMPLE 4

Compositions as identified in Table 5 were coated with the identified additive in the levels indicated and processed through a Berstorff extruder as described in Example 2. Viscosity measurements and torque reductions for each processed TPE sample were compared with TPE controls containing no added processing aid. ACR viscosity is shear viscosity measured using a Monsanto automatic capillary rheometer; extensional viscosity is measured using a Goettfert Rheotens rheometer.

TABLE 5

| Extruder Parameters | Torque Amps | % Reduc. Torque | Melt Press. | Ext Visc. at 190° C. kPa s | % Reduc. Ext. Visc. | ACR Visc. at 204° C. Poise | % Reduc. ACR Visc. |
|---|---|---|---|---|---|---|---|
| SAMPLE | | | | | | | |
| Control TPE-DS | 42 | 0.0 | 1256 | 51.4 | 0.0 | 183 | 0.0 |
| +0.5% AOK | 42 | 0.0 | 1254 | 47.3 | 8.0 | 148 | 19.1 |
| +1% AOK | 38 | 9.5 | 1165 | 50.5 | 1.8 | 151 | 17.5 |
| +2% AOK | 38 | 9.5 | 1140 | 45.6 | 11.3 | 140 | 23.5 |
| Control TPE-DT | 47 | 0.0 | 1733 | 91.9 | 0.0 | 927 | 0.0 |
| +0.5% AOK | 45 | 4.3 | 1615 | 95.2 | 3.6 | 829 | 10.6 |
| +1% AOK | 43 | 8.5 | 1580 | 83.5 | 9.1 | 876 | 5.5 |
| +2% AOK | 40 | 4.8 | 1431 | 78.2 | 14.9 | 746 | 19.5 |
| Control TPE-DSB | 34 | 0.0 | 1292 | 70.3 | 0.0 | 173 | 0.0 |
| +1% AOK | 32 | 5.9 | 1187 | 89.5 | 27.3 | 111 | 35.8 |
| Control TPE-DXL | 62 | 0.0 | 2284 | 639 | 0.0 | 12144 | 0.0 |
| +1% AOK | 54 | 12.9 | 1991 | 248 | 61.2 | 1550 | 87.2 |
| Control TPE-DSA | 46 | 0.0 | 2134 | 586 | 0.0 | 671 | 0.0 |
| +0.5% AOK | 43 | 6.5 | 2096 | 620 | 5.8 | 526 | 21.6 |
| +1% AOK | 40 | 13.0 | 1906 | 444 | 24.2 | 444 | 33.8 |
| +2% AOK | 33 | 21.4 | 1709 | 402 | 31.4 | 372 | 44.6 |

Results in Table 5 show a general reduction in torque for samples containing additive vs control samples free of additive and also a general reduction in extruder melt pressure, indicating improved flow. Reductions in extensional viscosity and ACR viscosities are also demonstrated as compared with the controls.

We claim:

1. A thermoplastic elastomer composition comprising a blend of:
   a. a thermoplastic polymer;
   b. a cross-linked olefinic rubber; and
   c. from about 0.005 to 5 wt %, based on the polymeric content of said blend, of at least one sulfate or sulfonate salt having the formula $(RSO_x) M$ wherein X is 3 or 4, R is an organic aliphatic radical containing from 6 to 30 carbon atoms and M is a cation selected from the group consisting of alkali metals, alkaline earth metals and ammonium.

2. The composition of claim 1 wherein said salt has a melting point lower than the softening point of said thermoplastic polymer.

3. The composition of claim 1 wherein said olefinic rubber is present in said composition at a level of about 10 to 90 wt % based on the total polymer content of said composition.

4. The composition of claim 1 wherein said thermoplastic polymer is a crystalline polyolefin homopolymer or copolymer.

5. The composition of claim 4 wherein said crystalline polyolefin is polypropylene or a copolymer of propylene with 1–20 wt % of ethylene or an alpha-olefin comonomer of 4–16 carbon atoms or mixtures thereof.

6. The composition of claim 1 wherein said salt is an alkali metal salt of an alkyl or alkenyl sulfonate containing 12 to 18 carbon atoms.

7. The composition of claim 6 wherein said salt is a sodium alpha-olefin sulfonate.

8. The composition of claim 1 wherein said salt is present in said composition at a level of from about 0.01 to about 0.5 wt %.

9. The composition of claim 1 wherein said olefinic rubber is selected from the group consisting of ethylene/propylene copolymers, ethylene/propylene/non-conjugated diene terpolymers, isobutylene copolymers, diolefin polymers and copolymers, and mixtures thereof.

10. The composition of claim 1 which further contains a rubber processing oil in said composition at a level of from about 1–200 parts by weight phr.

11. The composition of claim 1 wherein said olefinic rubber is crosslinked by dynamic vulcanization.

12. A process for forming a composition comprising melt blending a thermoplastic elastomer composition comprising a blend of:
   a. a thermoplastic polymer;
   b. a cross-linked olefinic rubber; and
   c. from about 0.005 to 5 wt %, based on the polymeric content of said blend, of at least one sulfate or sulfonate salt having the formula $(RSO_x)$ M wherein X is 3 or 4, R is an organic aliphatic radical containing from 6 to 30 carbon atoms and M is a cation selected from the group consisting of alkali metals, alkaline earth metals and ammonium.

13. The process of claim 12 wherein said salt has a melting point lower than the softening point of said thermoplastic polymer.

14. The process of claim 12 wherein said olefinic rubber is present in said composition at a level of about 10 to 90 wt % based on the total polymer content of said composition.

15. The process of claim 12 wherein said thermoplastic polymer is a crystalline polyolefin homopolymer or copolymer.

16. The process of claim 15 wherein said crystalline polyolefin is polypropylene or a copolymer of propylene with 1–20 wt % of ethylene or an alpha-olefin comonomer of 4–16 carbon atoms or mixtures thereof.

17. The process of claim 12 wherein said salt is an alkali metal salt of an alkyl or alkenyl sulfonate containing 12 to 18 carbon atoms.

18. The process of claim 17 wherein said salt is a sodium alpha-olefin sulfonate.

19. The process of claim 12 wherein said salt is present in said composition at a level of from about 0.01 to about 0.5 wt %.

20. The process of claim 12 wherein said olefinic rubber is selected from the group consisting of ethylene/propylene copolymers, ethylene/propylene/non-conjugated diene terpolymers, isobutylene copolymers, diolefin polymers and copolymers and mixtures thereof.

21. The process of claim 12 wherein said olefinic rubber is crosslinked by dynamic vulcanization.

22. The process of claim 12 wherein curatives for said olefinic rubber are added to said composition during said melt blending to form a dynamically vulcanized composition.

23. The process of claim 12 wherein said melt blending includes extrusion of said composition.

24. The composition of claim 1 which is free of added filler.

25. The process of claim 12 wherein said composition is free of added filler.

26. A process for forming a composition comprising melt blending a thermoplastic elastomer composition comprising:
   a. a thermoplastic polymer;
   b. an olefinic rubber; and
   c. from about 0.005 to 5 wt %, based on the polymeric content of said composition, of at least one sulfate or sulfonate salt having the formula $(RSO_x)$ M wherein X is 3 or 4, R is an organic aliphatic radical containing from 6 to 30 carbon atoms and M is a cation selected from the group consisting of alkali metals, alkaline earth metals and ammonium;
and subjecting said blended composition to crosslinking conditions to form a crosslinked composition.

27. The process of claim 26 wherein said composition is free of added filler.

* * * * *